3,195,978
METHOD OF RECOVERING POTASSIUM VALUES FROM BRINES

Maria G. Dunseth, Arlington, Va., and Murrell L. Salutsky, Silver Spring, Md., assignors to W. R. Grace & Co., New York, N.Y., a corporation of Connecticut
No Drawing. Filed Nov. 14, 1961, Ser. No. 152,168
13 Claims. (Cl. 23—25)

This invention relates to the treatment of magnesium and potassium-containing brines such as sea water. More specifically the invention relates to a method for treating such brines to recover potassium therefrom.

It is known that numerous salt water brines, such as sea water, contain substantial amounts of various valuable chemicals such as sodium, potassium, calcium, magnesium and so on. As the available supply of these chemicals from other sources dwindles and/or becomes more expensive, men have recently become more and more interested in the possibilities of using these brines as raw material sources. In many countries raw material sources are located largely in one geographic section, placing those users in other areas under an economic disadvantage because of shipping costs, etc. In the United States such a situation exists with respect to potash ($K_2CO_3$) which is found for the most part in western deposits. Since potash is widely used in the chemical industry for production of many potassium chemicals, eastern manufacturers would prefer to have another or at least an alternative source for obtaining potassium in a form suitable for use in making potassium chemicals.

It is an object of this invention to provide a method for removing potassuim from magnesium and potassium-containing brines, such as sea water. It is another object of this invention to provide a method for recovering potassium from these brines in a form suitable for use in producing other potassium chemicals. It is a specific object of this invention to provide a method for removing potassium from brines and recovering it as a solution of a potassium salt. Still another specific object of this invention is to provide a method for producing a solution of potasssium carbonate or bicarbonate from the potassium contained in sea water. Further objects will be apparent to those skilled in the art in view of the following more detailed description.

It has been found that the objectives stated above can be accomplished through a process which comprises introducing phosphate ions into a magnesium and potassium-containing brine, raising the pH of the phosphate-treated brine to within the range of from about 7.5 to about 9.5 with an ammonia-free base, and separating the precipitated solids from the sea water. For producing a solution of potassium salt the process includes the further step of reacting the solids separated from the brine with an aqueous solution of an ammonium salt to produce a solution of the corresponding potassium salt. For producing a solution of potassium carbonate or bicarbonate the ammonium salt used is ammonium carbonate or bicarbonate, respectively.

The invention will be fully explained below with particular reference to the treatment of sea water. It is to be understood, however, that other magnesium and potassium containing brines, e.g., inland salt waters, oil well brines, etc., can also be used. The initial step in the process of this invention is introducing phosphate ($PO_4^{-3}$) ions into sea water. The phosphate ions can be derived from any suitable source that will not itself precipitate below a pH of about 9.5. Particularly suitable as a source of phosphate ions is phosphoric acid ($H_3PO_4$), which can be reagent grade or, as shown in the examples, can be the commercially available unpurified wet process phosphoric acid commonly called "fertilizer grade" phosphoric acid. Also suitable are soluble phosphate compounds such as alkali metal phosphates, e.g., tri-, di- or monosodium phosphate, which will furnish phosphate ions and will not precipitate at pH below about 9.5. It is essential that no ammonium ion be introduced in this stage of the process, hence ammonium phosphate is unsuitable as a source of phosphate ions.

The amount of phosphate ions to be introduced depends upon the amount of calcium and magnesium ions in the sea water. It is preferred that the moles of phosphate ion introduced be at least equal to the sum of the moles of calcium and magnesium present in the sea water to be treated. As a minimum requirement, the mole ratio of $PO_4^{-3}$ to Ca+Mg must be at least equal to about 0.8. Mole ratios greater than about one may be used if desired but usually do not enhance the recovery of potassium and thus, for the purposes of this invention, are not economically justifiable. The amounts of calcium and magnesium in the sea water to be treated can be readily determined through use of the chlorinity ratios which, for all practical purposes, are constants. The best values for chlorinity ratios are shown by Barnes "The Analysis of Sea Water," Journal of the Analyst, the Journal of the Society for Analytical Chemistry, vol. 80 (August 1955), at page 578. Total chlorine content of the sea water to be treated can be readily determined by the standard Mohr or Volhard methods [cf., Barnes, supra, at p. 579]. As a first approximation, it is known that analyses of sea water have shown that the average concentrations of magnesium and calcium are about 1200 and 400 parts per million respectively. The magnesium and calcium content of other brines that can be used in the process of this invention are readily determined by known analytical procedures.

The introduction of phosphate ions into sea water or other brine changes the pH thereof. The degree to which pH is changed depends, of course, upon the source of phosphate ions and the particular brine treated. When phosphoric acid is used with sea water the pH will be decreased to about 1 to 3 whereas use of, e.g., disodium phosphate with sea water lowers the pH only to about 5.5 to 6.5. In any case, in the second step of the process the pH of the phosphate-treated brine is raised to within the range of from about 7.5 to about 9.5 by the addition of an ammonia-free base which will not form a salt less soluble than magnesium potassium phosphate with the magnesium and/or phosphate in the phosphate-treated sea water. Inorganic bases which may be used include sodium or potassium oxide, hydroxide, carbonate or the like. Although a potassium base (e.g., potassium hydroxide) may be used if desired such is obviously not preferred since it results in the formation of more potassium ions in the sea water. The most particularly preferred base (for reasons of economy) is sodium hydroxide which can, if desired, be in a mixed solution with sodium chloride, such mixed solution resulting from electrolysis of a sodium chloride brine. Furthermore, use of sodium hydroxide does not introduce any further foreign elements into the salt water brine, but merely results in a harmless increase in the sodium content. Organic bases such as amines can also be used if desired. Suitable organic bases include pyridine, guanidine, aniline, benzylamine, trimethylamine, trimethylenediamine, isoamylamine or the like. Monomethylamine forms magnesium monomethylammonium phosphate which is less soluble than magnesium potassium phosphate at pH's in the range required in the process of this invention, and hence cannot be used. In most cases the cost of suitable organic bases will be greater than that of inorganic bases, so that ordinarily use of the latter will be much preferred.

As previously stated, use of sodium hydroxide is most particularly preferred.

The term "ammonia-free" as used herein with reference to the base means that the base must not include any substantial amounts of ammonium ($NH_4^{+1}$) ion nor any compounds or materials that would decompose or ionize to form ammonium ions under the prevailing reaction conditions. The presence of ammonium ions during the precipitation effectively precludes or greatly reduces the removal of any potassium from the phosphate-treated sea water by displacement of potassium from the precipitate.

Raising the pH of phosphate-ion-containing brine to between about 7.5 and 9.5 will precipitate the major proportion of the potassium therein as a double phosphate salt with magnesium $MgKPO_4 \cdot 6H_2O$. Preferably the brine and base are stirred or otherwise agitated during the addition of the base. Digestion of the reaction mixture for a short period of time (e.g., for 10 to 30 minutes) while continuing agitation assures completion of the precipitation reaction. Changes in pH of the mixture during the neutralization can be accurately followed by use of a pH meter and slurry type electrodes.

Separation of the precipitated magnesium potassium phosphate from the sea water or other brine can be rapidly accomplished in known manner, e.g., by filtering, decanting or centrifuging. Filtration is the preferred mode of separation. The separated solids can then be dried in a hot air oven to remove occluded moisture, if such is desired.

Reaction of the precipitate produced with an aqueous solution of an ammonium salt produces a solution of the corresponding potassium salt. Any suitable ammonium salt may be used including inorganic salts such as ammonium chloride, ammonium bromide, ammonium iodide, ammonium fluoride, ammonium carbonate, ammonium bicarbonate, ammonium cyanide, ammonium ferrocyanide, ammonium ferricyanide, ammonium bifluoride, ammonium nitrate, ammonium nitrate, ammonium phosphate, ammonium sulfate, ammonium sulfite, ammonium sulfide or the like and organic salts such as ammonium acetate, ammonium formate, ammonium propionate, ammonium butyrate, ammonium benzoate, ammonium citrate, ammonium malate, ammonium laurate, ammonium stearate, ammonium oleate, ammonium salicylate, ammonium succinate, ammonium tartrate or the like. In short, the ammonium salts which can be used are those having the formula $$NH_4A$$

where A is any anion which will combine with potassium or ammonia to form a water soluble salt. The reaction of an aqueous solution of such an ammonium salt with the magnesium potassium phosphate precipitated from the brine proceeds in accordance with the following equation:

$$MgKPO_4 \cdot xH_2O + NH_4A \rightarrow MgNH_4PO_4 \cdot xH_2O + KA$$

where A is the same as previously defined and $x$ represents the number of moles of water of hydration.

The reaction between the aqueous solution of ammonium salt and the magnesium potassium phosphate precipitate is suitably accomplished by slurrying the phosphate in water, adding to the slurry the proper amounts of ammonium salt and agitating the admixture. Moderate heating of the admixture to temperatures in the range of from about 40° centigrade to about 75° centigrade, preferably between about 60° and about 65° centigrade, speeds up the reaction. The amounts of ammonium salt solution added obviously should be sufficient to provide a mole ratio of $NH_4$ to K greater than about 0.95, if it is desired to recover all of the potassium from the phosphate precipitate. Preferably the $NH_4$ to K mole ratio is about one. Reaction is usually substantially completed in a time period of about 30 minutes to about two hours.

The invention will be further illustrated by the following non-limiting specific examples.

EXAMPLE 1

*Removing potassium from sea water*

Samples of sea water collected at Ocean City, Maryland, were added to separate laboratory flasks in each of which there was placed two slurry type electrodes which were in turn connected to a Beckman pH meter. The sea water had a pH of 7.5, a density of 1.019 grams per cubic centimeter and analyzed 1.61 percent (by weight) total chlorine. Reagent grade phosphoric acid, analyzing approximately 86 percent by weight $H_3PO_4$, was added to each of the sea water samples in amounts sufficient to provide a $PO_4/Ca+Mg$ mole ratio equal to one. This lowered the pH of the sea water to 2.0. Varying amounts of a 10 Normal solution of sodium hydroxide were added in small increments to the different samples to raise the pH of one to 7.0 and of the other to 8.5. The mixtures were agitated by stirring during the incremental addition of sodium hydroxide. Stirring was continued while the mixtures were digested for about fifteen minutes after the total amount of hydroxide had been added. The precipitate formed was filtered out of the sea water and dried in an 80° centigrade circulating hot air oven. Results of analyses of the products are shown in Table I below.

TABLE I

| Example | 1A | 1B |
|---|---|---|
| Final pH | 7 | 8.5 |
| Grams of dried precipitate recovered | 11.9 | 21.0 |
| Analysis of dried precipitate (percent by weight): | | |
| Moisture | | 36.4 |
| $P_2O_5$ | 37.2 | 28.9 |
| MgO | 13.95 | 15.1 |
| $K_2O$ | 0.06 | 2.9 |
| Percent recovery from phosphate-treated sea water: | | |
| Mg | 18.57 | 89 |
| $P_2O_5$ | 23.65 | 81 |
| K | 0.37 | 78 |

The precipitate recovered at pH 8.5 contained magnesium potassium phosphate and other phosphates of magnesium and calcium. As shown by the data, pH less than about 7.5 gives very poor potassium recovery.

EXAMPLE 2

In this example the sea water and procedures used were the same as described in Example 1. The source of phosphate ions was reagent grade disodium phosphate which was used in amounts to provide a $PO_4/Ca+Mg$ mole ratio of about 0.33. This amount lowered the pH of the sea water samples to about 6.5. A 10 Normal aqueous solution of sodium hydroxide was added to each of five separate portions of the phosphate-treated sea water in varying amounts to give final pH's as shown in the results tabulated below. The precipitates were filtered out of the sea water and analyzed for potassium content. Results are summarized in Table II.

TABLE II

| Example | 2a | 2b | 2c | 2d | 2e |
|---|---|---|---|---|---|
| Final pH | 6.9 | 7.3 | 7.8 | 8.3 | 9.4 |
| Grams of dried precipitate recovered | 6.8 | 8.8 | 11.2 | 14.8 | 16.4 |
| $K_2O$ content (wt. percent) of dried precipitate | 0.38 | 0.22 | 0.28 | 0.18 | 0.32 |
| Percent K recovered from phosphate-treated sea water | 1.33 | 0.76 | 1.55 | 1.36 | 2.67 |

This example shows that low $PO_4$ to $Ca+Mg$ ratios result in negligible recovery of potassium from sea water, regardless of the final pH.

EXAMPLE 3

In this series of experiments fertilizer grade wet process phosphoric acid was added in varying amounts to each of 10 separate four-liter samples of sea water. The phosphoric acid contained about 50 percent by weight of $P_2O_5$ (corresponding to about 69 percent H₃PO₄), and smaller amounts of the various impurities ordinarily found in wet process phosphoric acid. Since some of these impurities (e.g., iron and aluminum) are precipitated as phosphates when the acid is neutralized, the amount of available $H_3PO_4$ must be correspondingly reduced when determining the $PO_4/Ca+Mg$ mole ratio. In runs 3a through 3e the ratio was about 1, while in runs 3f through 3j the $H_3PO_4$ was added in slight excess. The inorganic base used in each example was a 10 Normal aqueous solution of sodium hydroxide. The equipment and procedures used were the same as described in the previous examples. Results are shown in Table III.

TABLE III

| Example | 3a | 3b | 3c | 3d | 3e | 3f | 3g | 3h | 3i | 3j |
|---|---|---|---|---|---|---|---|---|---|---|
| Amount of acid added (grams) | 33.0276 | 33.0276 | 33.0276 | 33.0276 | 33.0276 | 33.3488 | 33.3488 | 33.3488 | 33.3488 | 33.3488 |
| Final pH | 7.5 | 8.0 | 8.5 | 9.0 | 9.5 | 7.5 | 8.0 | 8.5 | 9.0 | 9.5 |
| Grams of dried precipitate recovered | 23.6 | 40.8 | 42.1 | 50.9 | 48.1 | 32.6 | 42.0 | 43.4 | 48.5 | 52.7 |
| Analysis of dried precipitate: | | | | | | | | | | |
| K₂O | 1.1 | 0.7 | 2.7 | 2.2 | 3.0 | 1.8 | 2.3 | 2.5 | 2.7 | 2.7 |
| MgO | 13.4 | 12.3 | 14.6 | 13.7 | 14.8 | 13.9 | 12.8 | 13.7 | 15.0 | 14.6 |
| P₂O₅ | 32.7 | 24.7 | 30.3 | 26.8 | 29.4 | 31.6 | 27.9 | 29.6 | 28.8 | 25.8 |
| Percent recovery from phosphate-treated sea water: | | | | | | | | | | |
| K | 15.6 | 17.7 | 71.2 | 70.0 | 89.9 | 37.2 | 59.9 | 66.2 | 81.9 | 87.4 |
| P₂O₅ | 49.5 | 64.6 | 82.0 | 87.5 | 90.7 | | | | | |
| Mg | 42.7 | 67.6 | 82.9 | 93.7 | 95.9 | 60.9 | 72.6 | 80.3 | 97.8 | 103.6 |

The data in Table III show that generally the amount of potassium removed increases with increasing pH until at about pH of 8.5 to 9.5 substantially all potassium initially in the sea water has been precipitated. The data also show that to recover any significant amount of the potassium the minimum pH after addition of the ammonia-free base must be about 7.5. Comparison of runs 3a to 3e with runs 3f to 3j shows that use of excess amounts of phosphate ions does not result in any significant increase in potassium recovered.

EXAMPLE 4

*Recovery of potassium from magnesium potassium phosphate*

A slurry of 17.64 grams of magnesium potassium phosphate monohydrate in 500 milliliters of water was placed in a laboratory flask. Ammonium bicarbonate (15.8 grams) was then added and dissolved in the slurry. The mixture was agitated for about one hour at temperatures ranging between 60° and 65° centigrade. The slurry was then filtered, and the filter cake was washed with deionized water and dried to constant weight at room temperature. Analysis of the original phosphate and of the solid product gave the following results:

| | Original | Product |
|---|---|---|
| Sample weight (grams) | 17.64 | 15.1 |
| Analysis (percent by weight): | | |
| P₂O₅ | 38.7 | 39.7 |
| K₂O | 25.87 | 0.62 |
| MgO | 23.59 | 23.2 |
| N | | 5.25 |

The solid product was found to be magnesium ammonium phosphate containing some water of hydration. The filtrate contained substantially all (about 98%) of the potassium in the form of a potassium bicarbonate solution which could be used as such or could serve as a raw material for the production of virtually any other desired potassium compound.

This example shows that potassium precipitated from sea water as magnesium potassium phosphate can be recovered therefrom as an aqueous solution. The instant example taken together with the previous examples shows a process for recovering substantial proportions of the potassium in sea water or other magnesium and potassium brines in a commercially valuable form.

What is claimed is:

1. Method of producing an aqueous solution of a potassium salt from sea water which comprises adding to sea water sufficient amounts of phosphate ($PO_4^{-3}$) ions to provide a $PO_4/Mg+Ca$ mole ratio of at least 0.8, adding sufficient amounts of ammonia-free sodium hydroxide to raise the pH of the phosphate-treated sea water to within the range of from about 7.5 to about 9.5, separating the potassium-containing precipitated solids, reacting the separated solids with an aqueous solution of an ammonium salt of the formula NH₄A where A represents an anion which forms a water soluble salt with potassium and ammonia, said ammonium salt solution providing sufficient amounts of ammonium ions to yield a $NH_4/A$ mole ratio greater than about 0.95, continuing said reaction for a sufficient period of time to solubilize substantially all of the potassium in the precipitated solids, and separating the aqueous solution of potassium salt thereby formed.

2. Method of recovering an aqueous solution of potassium bicarbonate from sea water which comprises adding to said sea water sufficient amounts of phosphate ($PO_4^{-3}$) ions to provide a $PO_4/Mg+Ca$ mole ratio of at least 0.8, adding sufficient amounts of ammonia-free sodium hydroxide to raise the pH of the phosphate treated sea water to within the range of from about 7.5 to about 9.5, separating the potassium-containing precipitated solids, reacting the separated solids with sufficient amounts of an aqueous solution of ammonium bicarbonate to provide a $NH_4/K$ mole ratio of about 1, continuing said reaction for a sufficient period of time to solubilize substantially all of the potassium in the precipitated solids, and separating the aqueous solution of potassium bicarbonate thereby produced.

3. Method of recovering potassium values from brines which comprises adding phosphate ions to said brine, raising the pH of the phosphate-treated brine to greater than about 7.5 with an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine to precipitate potassium-containing solids from said brine, and separating the precipitated solids from the brine.

4. Method of recovering potassium values from brines which comprises adding to said brine sufficient amounts of phosphate ($PO_4^{-3}$) ions to provide a $PO_4/Mg+Ca$ mole ratio of at least 0.8, adding sufficient amounts of an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine to raise the pH of the phosphate-treated brine to within the range of from about 7.5 to about 9.5 to precipitate potassium-containing solids from said brine, and separating the precipitated solids from the brine.

5. Method of recovering potassium values from brines which comprises adding to said brine sufficient amounts of phosphate ($PO_4^{-3}$) ions to provide a $PO_4/Mg+Ca$ mole ratio of at least 0.8, adding sufficient amounts of ammonia-free sodium hydroxide to raise the pH of the phosphate treated brine to within the range of from about 7.5 to about 9.5 to precipitate potassium-containing solids from said brine, and separating the precipitated solids from the brine.

6. Method of recovering potassium values from sea water which comprises adding phosphate ions to said sea water, raising the pH of the phosphate-treated sea water to greater than about 7.5 with an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine to precipitate potassium-containing solids from said sea water, and separating the precipitated solids from the sea water.

7. Method of recovering potassium values from sea water which comprises adding to said sea water sufficient amounts of phosphate ($PO_4^{-3}$) ions to provide a $PO_4/Mg+Ca$ mole ratio of at least 0.8, adding sufficient amounts of an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine to raise the pH of the phosphate treated sea water to within the range of from about 7.5 to about 9.5 to precipitate potassium-containing solids from said sea water and separating the precipitated solids from the sea water.

8. Method of recovering potassium values from sea water which comprises adding to sea water sufficient amounts of phosphoric acid to provide a $PO_4/Mg+Ca$ mole ratio of at least 0.8, adding sufficient amounts of ammonia-free sodium hydroxide to raise the pH of the phosphate-treated sea water to within the range of from about 8.5 to about 9.5 to precipitate potassium-containing solids from said sea water, and separating and recovering the precipitated solids from the sea water.

9. Method of recovering potassium values from sea water which comprises adding to said sea water sufficient amounts of disodium phosphate to provide $PO_4/Mg+Ca$ mole ratio of at least 0.8, adding sufficient amounts of ammonia-free sodium hydroxide to raise the pH of the phosphate-treated sea water to within the range of from about 7.5 to about 9.5 to precipitate potassium-containing solids from said sea water, and separating the precipitated solids from the sea water.

10. Method of recovering an aqueous solution of a potassium salt from brines which comprises adding phosphate ions to said brine, raising the pH of the phosphate-treated brine to greater than about 7.5 with an ammonia-free base which does not form a salt less soluble than magnesium potassium phosphate under the conditions prevailing in said brine to precipitate potassium-containing solids from said brine, separating the precipitated solids from the brine, reacting the separated solids with an aqueous solution of an ammonium salt having the formula $NH_4A$, where A is any anion which will combine with a member selected from the group consisting of potassium and ammonia ions to form a water-soluble salt, for a sufficient period of time to at least partially solubilize the potassium in said solids, and separating the solution of potassium salt thereby produced.

11. Method of recovering an aqueous solution of a potassium salt from brines which comprises adding phosphate ions to said brine, raising the pH of the phosphate-treated brine to greater than about 7.5 with an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine, to precipitate potassium-containing solids from said brine, separating the precipitated solids from the brine, reacting the separated solids with an aqueous solution of an ammonium salt having the formula $NH_4A$, where A represents an anion which forms a water soluble salt with potassium and with ammonia, continuing said reaction for a sufficient period of time to solubilize substantially all of the potassium in said solids, and separating the aqueous solution of potassium salt thereby produced.

12. Method of recovering an aqueous solution of a potassium salt from sea water which comprises adding phosphate ions to said sea water, raising the pH of the phosphate-treated sea water to greater than about 7.5 with an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine, to precipitate potassium-containing solids from said sea water, separating the precipitated solids from the sea water, reacting the separated solids with an aqueous solution of an ammonium salt having the formula $NH_4A$, where A is an anion which will combine with a member selected from the group consisting of potassium and ammonia ions to form a water soluble salt for a sufficient period of time to at least partially solubilize the potassium in said solids, and separating the solution of potassium salt thereby produced.

13. Method of recovering an aqueous solution of a potassium salt from sea water which comprises adding phosphate ions to said sea water, raising the pH of the phosphate-treated sea water to greater than about 7.5 with an ammonia-free base from the group consisting of sodium oxide, potassium oxide, sodium carbonate, potassium carbonate, sodium hydroxide, potassium hydroxide, pyridine, guanidine, aniline, benzylamine, trimethylamine, trimethylenediamine, and isoamylamine to precipitate potassium-containing solids from said sea water, separating the precipitated solids from the sea water, reacting the separated solids with an aqueous solution of an ammonium salt having the formula $NH_4A$ where A represents an anion which forms a water soluble salt with potassium and with ammonia, continuing said reaction for a sufficient period of time to solubilize substantially all of the potassium in said solids, and separating the aqueous solution of potassium salt thereby produced.

References Cited by the Examiner

UNITED STATES PATENTS

| | | | |
|---|---|---|---|
| 1,820,160 | 8/31 | Rusberg | 23—40 |
| 1,881,195 | 10/32 | Kaselitz | 23—105 X |
| 2,002,797 | 5/35 | Reich | 23—105 X |
| 3,126,254 | 3/64 | Salutsky et al. | 23—105 |

FOREIGN PATENTS 247,405  2/26  Great Britain.

MAURICE A. BRINDISI, Primary Examiner.

GEORGE D. MITCHELL, Examiner.